Sept. 11, 1923.                          1,467,681
C. A. PETERS
CLUTCH CONTROLLING MEANS
Filed May 13, 1918            2 Sheets-Sheet 1

WITNESSES

INVENTOR
CORNELIUS A. PETERS
BY
ATTORNEYS

Sept. 11, 1923.
C. A. PETERS
1,467,681
CLUTCH CONTROLLING MEANS
Filed May 13, 1918     2 Sheets-Sheet 2
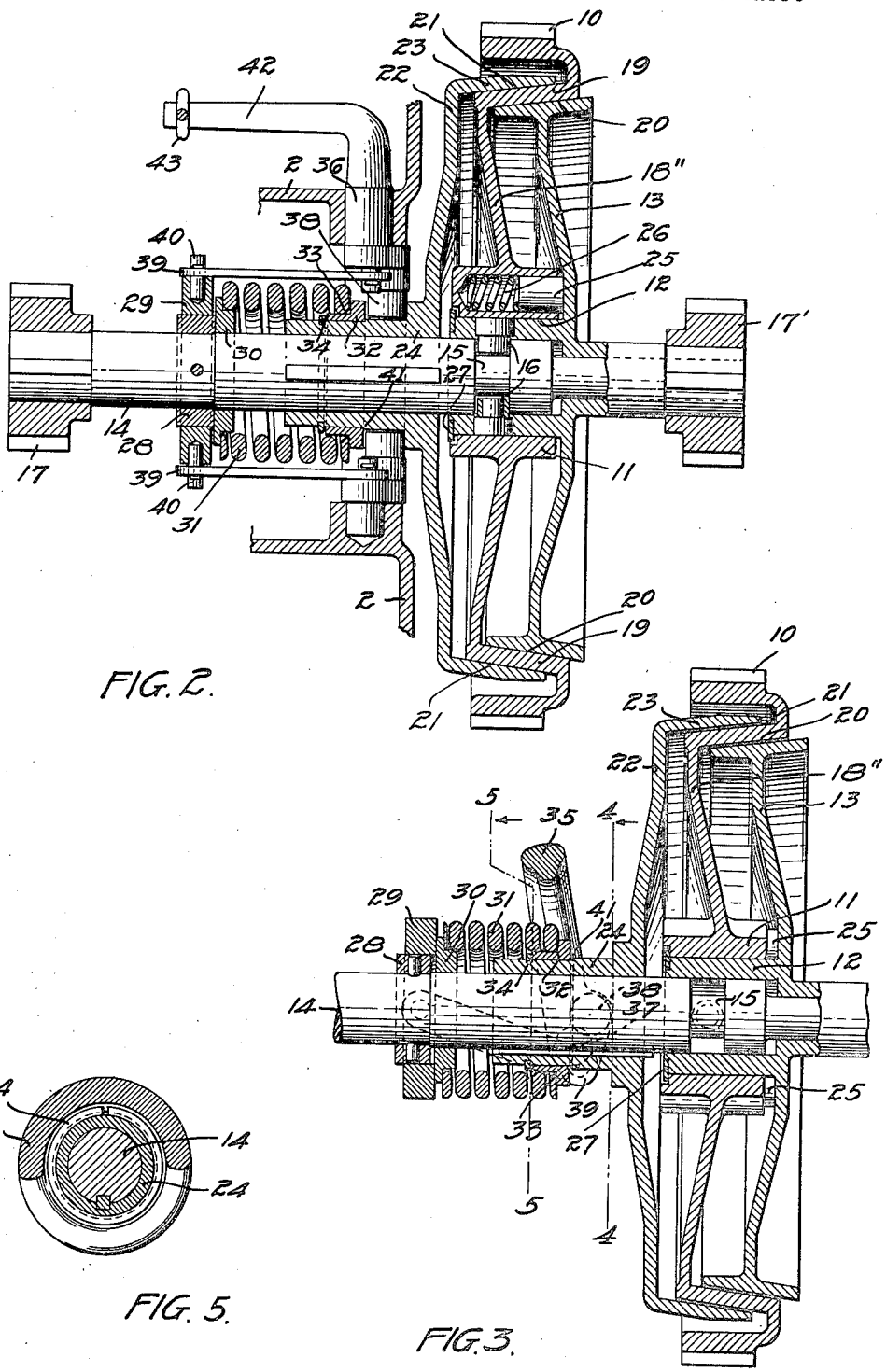
INVENTOR
CORNELIUS A. PETERS Patented Sept. 11, 1923.

1,467,681

UNITED STATES PATENT OFFICE.

CORNELIUS A. PETERS, OF MINNEAPOLIS, MINNESOTA, ASSIGNOR, BY MESNE ASSIGNMENTS, TO BEEMAN TRACTOR COMPANY, OF MINNEAPOLIS, MINNESOTA, A CORPORATION OF MINNESOTA.

CLUTCH-CONTROLLING MEANS.

Application filed May 13, 1918. Serial No. 234,086.

*To all whom it may concern:*

Be it known that I, CORNELIUS A. PETERS, a citizen of the United States, resident of Minneapolis, county of Hennepin, State of Minnesota, have invented certain new and useful Improvements in Clutch-Controlling Means, of which the following is a specification.

My invention, while adapted for clutches generally, is particularly designed for use with a small or what is known as a "garden tractor" machine, where it is desirable to permit the traction wheels and the countershaft through which power is transmitted to the wheels from the engine to have freedom of movement in turning the machine, with the usual friction arising from the compression of the clutch operating spring entirely eliminated, and to this end the object of my invention is to so mount the spring through which one member of the clutch is operated that when this clutch member is moved to a released position and the spring put under compression, the power of the spring will not be exerted on the driving shaft or the pinions to resist the freedom of movement of the wheels.

The invention consists generally in various constructions and combinations, all as hereinafter described and particularly pointed out in the claims.

In the accompanying drawings forming part of this specification,

Figure 2 is a detail sectional view through the clutch and clutch operating mechanism showing the clutch in its locked position, Figure 3 is a similar view showing the clutch in its released position, taken at right angles to Figure 2, Figure 5 is a sectional view on the line 5—5 of Figure 3.

Figure 1:
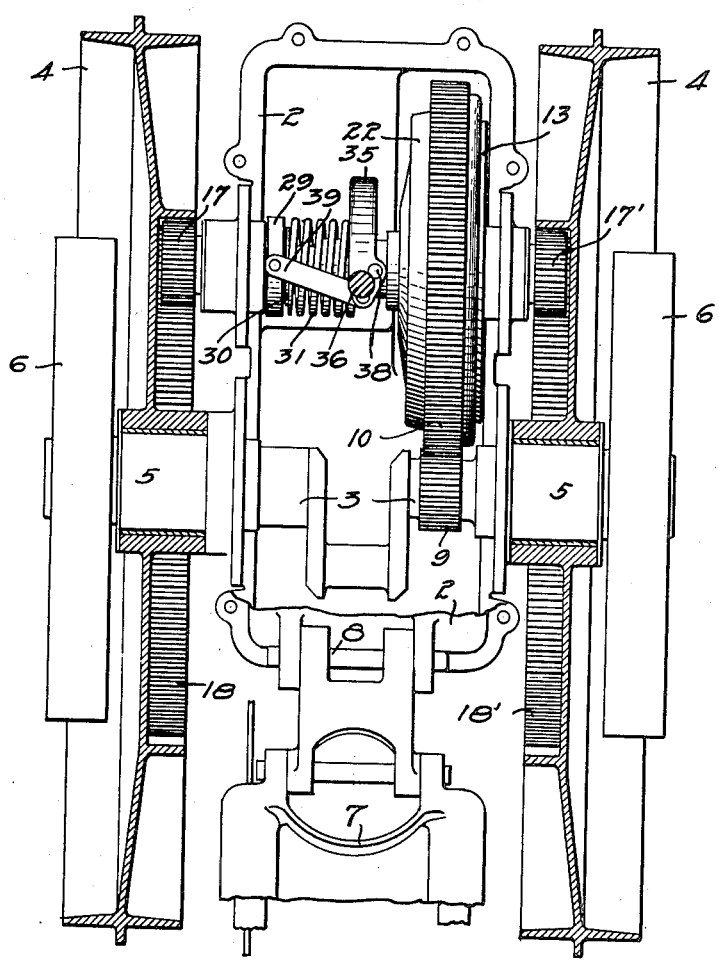
Figure 1 is a plan sectional view of a traction machine embodying my invention.
Figure 4:
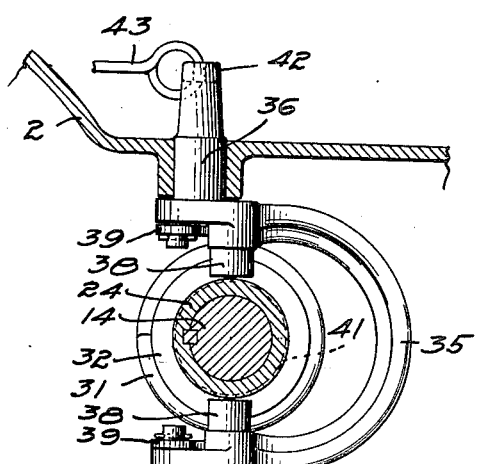
Figure 4 is a sectional view on the line 4—4 of Figure 3.

In the drawing, 2 represents a suitable frame wherein a crank shaft 3 of the engine (not shown) is mounted. Traction wheels 4 are journaled on the projecting ends 5 of the crank shaft, which are also preferably provided with fly wheels 6. The steering mechanism 7, which forms no part of this present invention, is connected at 8 to the machine frame. A driving pinion 9 is mounted on the crank shaft and meshes with a gear 10 formed on the periphery of a wheel 11 which forms one member of a clutch and is loosely mounted on the hub 12 of a second clutch member 13. The hub 12 is mounted on a counter shaft 14 which shaft has preferably an annular groove 15 to receive pins 16 in the hub 12, which hold the said hub against longitudinal movement while permitting the counter shaft to turn freely therein. The shaft 14 has a pinion 17 at its end which meshes with an internal gear 18 formed on one of the traction wheels. The clutch member 13 has a similar pinion 17' secured to its hub 12 through which the small end of the shaft 14 passes, and the pinion 17' meshes with a gear 18' on the other traction wheel. The wheel 11 has a radial web 18'' on the outer portion of which a flange 19 is formed within the circle of the gear 10 and integral therewith and provided with inner and outer friction surfaces 20 and 21 and the clutch member 13 has a peripheral surface to engage the surface 20 while a third clutch member 22 has a flange 23 to engage the surface 21. The flange 19 and clutch members have sufficient flare or divergence from their axes so that when the clutch member 22 is forced against the surface 21, the clutch member 11 will be pressed against the member 13 and its surface 20 and thereby the said members will be locked together. The member 22 has a hub 24 splined on the countershaft for the transmission of power from the gear 10 through the clutch members to the shaft 14 to drive the pinion 17 and one of the traction wheels. The opposite wheel is driven through the clutch member 13, its pinion 17' and the gear 18'.

Pins 25 are preferably mounted in sockets in the web 18'' and held outwardly by springs 26 for separating the clutch members when the pressure of the member 22 thereon is relieved for the purpose of allowing the gear 10 and the intermediate clutch member to run idle. Movement of the intermediate clutch member 11 on the hub is preferably limited by means of a band 27 (see Figure 2). From the foregoing it is evident that movement of the clutch member 22 on the counter shaft in one direction will engage its friction surface with the surface 21 of the intermediate member and force the intermediate member into frictional engagement with the other member 13 and thereby lock the gear 10 for the transmission of power from the engine to the countershaft and traction wheels.

I will now proceed to describe the mechanism which forms the subject matter of my present invention and by means of which the countershaft is relieved of the friction which would normally arise through the compression of the clutch operating spring when the clutch is moved to its release position.

Upon the countershaft a collar 28 is secured and free to revolve with the shaft within a ring 29. A collar 30 is loosely mounted on the shaft and seated against the collar 28 and has a bearing for one end of a compression spring 31. A collar 32 is loosely mounted on the hub 24 and has a seat 33 for the spring 31 and a split ring 34 is seated in the hub 24 and forms a stop for the collar 32 so that when outward pressure is applied to said collar, it will engage the said ring and move the hub 24 and the clutch member thereon out of engagement with the intermediate clutch member and put the spring 31 under compression. A yoke 35 has bearing pins 36 and 37 in the frame of the machine and is provided with pins 38 eccentric with respect to said bearing pins, and projecting inwardly toward the hub 34 in position to engage the collar 32 when the said yoke is rocked on its supporting pins 36 and 37. Links 39 connect the yoke 35 eccentrically with respect to its bearing pins and the pins 38 with pins 40 peripherally mounted in the ring 29.

The hub 24 has a shoulder 41 formed therein against which the collar 32 is normally seated and held by the pressure of the spring 31, and through which shoulder the power of the spring is transmitted to the hub 24 and the clutch member 22 to seat it on the friction surface 21. The bearing pin 36 is provided with a crank arm 42 to which a connection 43 is made for rotating the bearings 36 and 37 and rocking the yoke 35 to put the spring under compression and at the same time relieve the countershaft of any friction which normally would result from the application of power to compress the spring and withdraw the clutch member from its working position. The initial movement of the yoke will move the pins 38 in one direction to force the collar 32 outwardly against the ring 34 to withdraw the clutch member from its locking position. At the same time the pivotal connections of the links 39 with the yoke, being on the other side of the bearing pins 36 and 37, will cause the links and the rings 29 and 30 to move in the opposite direction to exert a compressing effect on the outer end of the spring 31 and thereby the said spring will be compressed from both ends and the shaft 14 and the pinions will be free and idle and may be revolved with their respective clutch members and allow the traction wheels to revolve easily to turn the machine.

I claim as my invention:

1. The combination, with a shaft, of clutch members mounted thereon, a spring for normally holding one of said clutch members in engagement with another member for transmitting power through said shaft, a collar mounted to bear on one end of said spring, a second collar secured to said shaft at the other end of said spring, means loosely mounted on said second collar and means for moving said first named collar and said loosely mounted means toward one another to compress said spring and relieve the pressure on said clutch member without transmitting it to said shaft, said moving means comprising a yoke having a bearing on said first collar and links connecting said yoke with said loosely mounted means.

2. The combination, with a driving shaft, of a clutch mounted on said shaft and having a driven gear member and a member slidable on said shaft for locking or releasing said gear member, a spring for normally holding said members in their clutching position and means mounted to apply pressure to both ends of said spring to relieve said clutch members and prevent end thrust on said shaft, said pressure applying means comprising a yoke at one end of said spring, a ring at the opposite end of said spring, and links connecting said yoke with said ring between which yoke and ring said spring is compressed.

3. The combination, with a shaft, of a clutch thereon having a slidable member provided with a hub, a spring for normally holding said slidable member in its locking position, a collar mounted on said hub, a split ring seated on said hub and forming a stop for limiting the movement of said collar in one direction, a yoke having means for engaging said collar to compress said spring at one end thereof, a ring mounted to transmit pressure to the other end of said spring and links connecting said yoke with said ring for releasing the pressure of said spring on said clutch member without end thrust on said shaft.

4. The combination, with a shaft, of a clutch on said shaft having a member slidable thereon for releasing said clutch, a spring for normally holding said clutch member in its locking position, a yoke having eccentrically mounted pins for engaging said clutch member to compress said spring at one end thereof, and links pivoted on said yoke on the opposite side of its bearing with respect to said pins and having means for applying pressure to the other end of said spring to relieve the pressure thereof on said shaft.

5. The combination, with a shaft, of clutch members mounted thereon, a spring for normally holding one of said clutch members in engagement with another member for transmitting power through said shaft, a collar mounted to bear on one end of said spring, a second collar secured on said shaft at the other end of said spring, a ring loosely mounted on said second collar and means for moving said first named collar and said ring toward one another to compress said spring and relieve the pressure on said clutch member without transmitting it to said shaft.

6. The combination, with a shaft, of a clutch mounted thereon and comprising outer and intermediate members, one being fixed and the others having an axial movement toward and from said fixed member, a spring for normally holding said axially movable members in engagement with said fixed member and mechanism positioned with said spring on one side of said clutch members for applying pressure to both ends of said spring to release said clutch members and relieve said shaft of end thrust of said spring thereon, said mechanism including a rocking member at one end of said spring, a sliding member at the other end, and means connecting said rocking and sliding members.

7. The combination, with a shaft, of a clutch mounted thereon and comprising outer and intermediate members, one being fixed and the others having an axial movement toward and from said fixed member, a spring arranged on said shaft at one side of said clutch and having a bearing at one end one on one of said movable members, a rocking member arranged to straddle said shaft on one side of said spring, a sliding member on the other side of said spring, and means connecting said rocking and sliding members.

In witness whereof, I have hereunto set my hand this 29th day of April, 1918.

CORNELIUS A. PETERS.